US012566134B2

(12) United States Patent
Dias Fonseca Martins et al.

(10) Patent No.: US 12,566,134 B2
(45) Date of Patent: Mar. 3, 2026

(54) SHEAROGRAPHY SYSTEM FOR SUBSEA INSPECTIONS

(71) Applicants: PETRÓLEO BRASILEIRO S.A.—PETROBRAS, Rio de Janeiro (BR); UNIVERSIDADE FEDERAL DE SANTA CATARINA—UFSC, Florianópolis (BR)

(72) Inventors: Fabiana Dias Fonseca Martins, Rio de Janeiro (BR); Eduardo César Cordeiro Vieira, Florianópolis (BR); Mauro Eduardo Benedet, São José (BR); Sergio Damasceno Soares, Petrópolis (BR); Daniel Pedro Willemann, Laguna (BR); Armando Albertazzi Gonçalves, Jr., Florianópolis (BR); Claudio Ramos Schmitz, Florianópolis (BR); Filipe Zanini Broetto, Florianópolis (BR); Ana Lucia Fampa Seabra Dalmeida, Florianópolis (BR); Analucia Vieira Fantin, Rio de Janeiro (BR)

(73) Assignees: Petróleo Brasileiro S.A.—Petrobras, Rio de Janeiro (BR); Universidade Federal De Santa Catarina—UFSC, Florianópolis (BR)

( * ) Notice: Subject to any disclaimer, the term of this patent is extended or adjusted under 35 U.S.C. 154(b) by 685 days.

(21) Appl. No.: 17/890,458

(22) Filed: Aug. 18, 2022

(65) Prior Publication Data
US 2023/0056235 A1 Feb. 23, 2023

(30) Foreign Application Priority Data
Aug. 18, 2021 (BR) ........................... 1020210163933

(51) Int. Cl.
*G01N 21/45* (2006.01)

(52) U.S. Cl.
CPC .................................... *G01N 21/45* (2013.01)

(58) Field of Classification Search
None
See application file for complete search history.

(56) References Cited

U.S. PATENT DOCUMENTS

| | | | | |
|---|---|---|---|---|
| 6,040,900 A * | 3/2000 | Chen | ...................... | G01N 25/72 |
| | | | | 356/520 |
| 10,330,463 B2 * | 6/2019 | Yang | ......................... | G01L 1/24 |
| 12,265,024 B2 * | 4/2025 | Damasceno Soares | ..................... | |
| | | | | G01N 21/8851 |

(Continued)

*Primary Examiner* — Stephanie E Bloss
*Assistant Examiner* — Diana Hancock
(74) *Attorney, Agent, or Firm* — SALIWANCHIK, LLOYD & EISENSCHENK

(57) ABSTRACT

The present invention proposes the use of the shearography technique in a system for the non-destructive inspection of composite material repairs applied to submerged metallic pipelines.

The shearography system of the invention is characterized in that it comprises at least one vision and lighting module (VLM) (1), at least one fixation module (FM) (2), at least one excitation module (TEM) (3), at least one command and power module (CPM) (4), and a computer (5).

The proposed system can be fixed to the repaired pipe by means of divers or ROVs, and the inspection control can be carried out entirely from the platform or surface support vessel.

27 Claims, 6 Drawing Sheets

(56) References Cited

U.S. PATENT DOCUMENTS

2011/0179874 A1 * 7/2011 Kurtz ................... G01N 29/043
                                                  73/633
2021/0080399 A1 * 3/2021 Hatahori ............ G01N 21/8806
2023/0052634 A1 * 2/2023 Tomblin ................. B29C 73/26

* cited by examiner

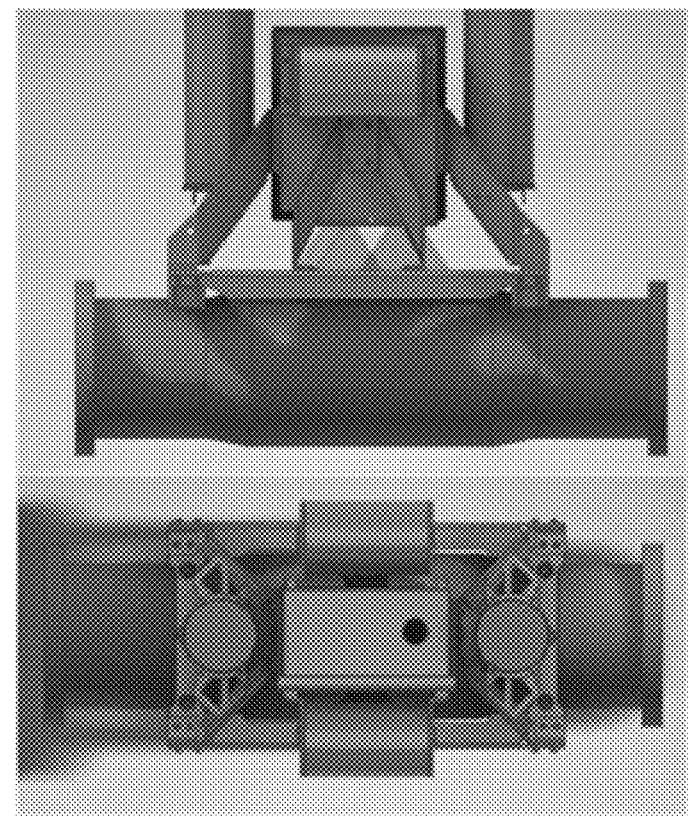
FIG. 5A
FIG. 5B
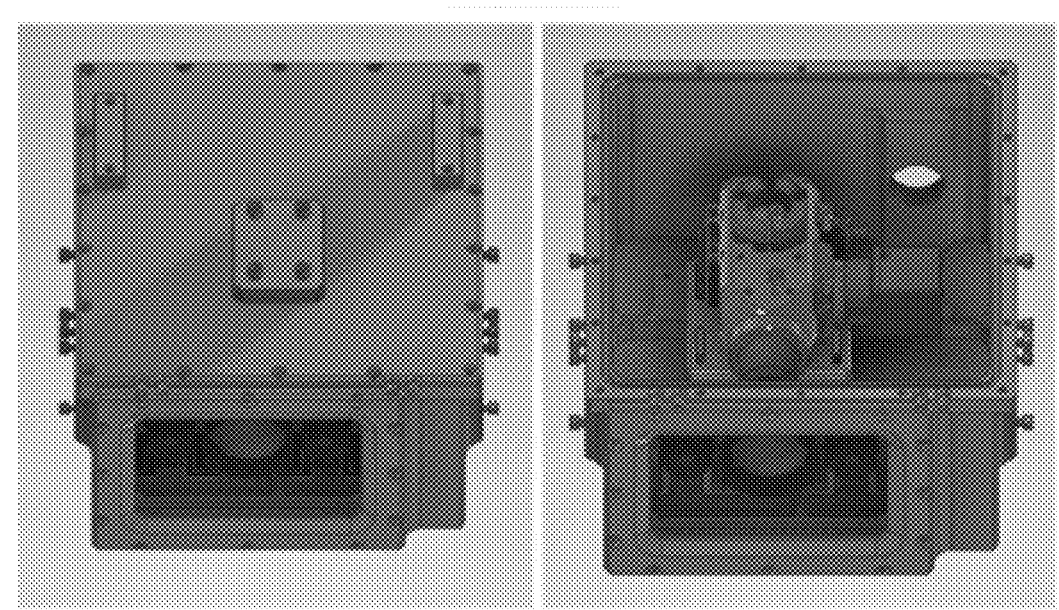
FIG. 6

SHEAROGRAPHY SYSTEM FOR SUBSEA INSPECTIONS

CROSS-REFERENCE TO A RELATED APPLICATION

This application claims priority to Brazilian Patent Application No. 1020210163933, filed on Aug. 18, 2021; which is incorporated herein in its entirety.

FIELD OF THE INVENTION

The present invention is based on the development of a shearography system specially designed to carry out submerged inspections of pipes coated in composite material.

The proposed system can be fixed to the repaired pipe by means of divers or ROVs and the inspection control can be carried out entirely from the platform or support vessel on the surface.

DESCRIPTION OF THE STATE OF THE ART

Shearography is an interferometric technique already used in the oil sector for the inspection of repairs in composites applied to metallic pipelines. However, until now, its use has been restricted to dry environments (not submerged). Even in dry environments, the application of interferometric measurement systems outside the laboratory is not simple, because in the field such systems are exposed to disturbing agents, over which there is no control. In this way, the development of robust inspection systems capable of operating properly in the field is very important. The research and improvement of interferometric techniques, in order to make them robust and capable of operating in more aggressive working conditions, such as on an oil platform, on the factory floor, or other hostile environment, has become increasingly more important.

The term "shearography" is attributed to an interferometric technique that uses laser and image processing to measure the strain field on the surface of the inspected structure. Unlike other interferometric techniques, shearography can be applied in the field, away from isolated laboratory benches. It has been widely used to reveal defects in composite structures and panels, especially in the aerospace industry. The surface to be inspected is laser-illuminated and its initial image acquired. A certain type of loading (thermal, by vibrations and pressure variation—positive or negative) is applied to the inspected part, causing the appearance of a strain field on its surface. A second image is then acquired and numerically combined with the first one. After image processing, the surface strain field is revealed in the form of interference fringes. The presence of defects within the composite material is mapped as discontinuities in the strain field, which is visually identifiable.

The results obtained from the technologies developed in recent years, and from the work carried out in the field, motivated the expansion of shearography to new applications in the Oil and Gas industry. Subsea inspection of composites is, without a doubt, a field of great interest to Petrobras, but few solutions are still viable. This scenario motivated the development of a new shearography system, unprecedented worldwide, capable of inspecting, in an underwater environment, composite repairs in rigid pipes. Therefore, the shearography system proposed in this patent allows performing, in an automated way, measurements with shearography in an underwater environment.

Composite materials are being used more and more in various industrial segments. The aerospace sector is the one that most uses this type of material. However, industries in the oil, gas and energy sector follow this trend, mainly due to the high strength/weight ratio, immunity to corrosion, and the possibility of "cold" application of these materials. In the oil and gas industry, the possibility of cold application is very attractive, as it eliminates the need to isolate the environment and leave it free from risks of combustion and explosion. More recently, the application of composites to repair corroded pipelines, internally or externally, can also be carried out in a submerged environment. The use of pre-preg composite materials with water-activated resins further facilitates the application of repairs in rainy, wet and fully submerged environments. One can also mention the advantage that these composite repairs can be easily applied to different diameters and pipelines and to structures with irregular shapes and geometries, such as pipeline connections.

Two classes of applications for composite materials are well known in the oil, gas and energy industry: repairs of composite materials applied to metallic structures and structural elements entirely produced in composite materials. The first class involves applying a layer of composite material over a metallic structural element, often a pipeline, either to serve as a corrosion barrier or as a structural reinforcement. The second class mainly involves tubes and pressure vessels made entirely of composite materials.

In the oil and gas industry, the history of failures with composite materials is predominantly related to assembly defects or problems during the application of coatings in the field. This is the typical case for repairs and protective coatings of composites and unions between composite material tubes. In both cases, the application conditions are usually not favorable, resulting in a higher probability of defects such as: adhesion failures (at the metal-composite and composite-composite interfaces); delaminations (adhesion failures between the layers of the composite); inclusions (presence of bubbles and foreign bodies between the layers of the composite) and inhomogeneity in the distribution of fibers in the composite.

In a submerged environment, the application difficulties are potentiated by the environment in which the diver is himself/herself. In structures made entirely of composite material, there may also be defects arising from the manufacturing process of these components.

Defects in protective coatings and repairs can compromise the effectiveness of the protection or structural reinforcement. If not detected and corrected, defects in joints and unions of composite tubes can evolve and lead to operational failures, resulting into the risk of product leakage.

The use of composites has proved to be an excellent solution for the repair of metallic pipelines and, therefore, its use has grown in the field. However, the low offer of specific and effective inspection services means that the use of composite is still restricted. Consequently, the lack of inspection causes many of the repairs to be removed and redone early as a safety measure, generating higher production costs. Therefore, in the current state of use of these materials, it is imperative to inspect the coatings and repairs applied in the field, as well as the unions and joints of structures made entirely of composite material.

Shearography is a non-destructive testing technique capable of locating internal defects in composite materials and has been widely used for the detection of delaminations and adhesion failures. These are the most commonly encountered failures in composite material repairs.

In the last decade, shearography has gained wide acceptance in the aerospace industry as it is a fast, low-cost and, above all, effective inspection method. Its acceptance and commercial application in the oil and gas industry has also been growing in recent years, as a result of developments in this field.

The inspection technique by shearography of this invention can prevent repairs that are still intact from being replaced, therefore reducing maintenance costs, and increasing the protection of revenue from lost profit, avoiding stops to replace subsea sections, or operational interventions.

The product of this invention defines a system for performing non-destructive inspections with shearography on composite material coatings applied to metallic pipelines located in fully submerged environments or in the TVZ (Tidal Variation Zone)—environments with the possibility of occurrence of Severe corrosion on metal structures. Other composite structures may also be inspected in these environments.

The system proposed in the invention may be fixed to the repaired pipe by means of divers or ROVs, and the inspection control is carried out entirely from the platform or support vessel on the surface.

The non-patent document "Shearography Systems for Inspection of Large Vertical Areas Coated by Composite Materials" discloses 2 (two) shearography systems for inspection, one of them manual, and the other for future use in conjunction with a robot actuated by cables. The system comprises image acquisition module, laser lighting module, loading module, Control and Power Module, thermal loading module, and structural module. Despite presenting shearography for inspection, the document, however, does not have a suitable fixing structure to be fitted to a pipeline that is to be inspected, such as the present invention.

Document CN101418875B discloses a special positioning and fixing device for an automatic submerged tube flange bonding machine. The fixing device, disclosed in CN101418875B, differs from the fixing module proposed by the invention.

Document US20040165176A1 discloses a portable non-destructive testing instrument, which uses high-speed phase shearography and vacuum stress to produce images of joint defects, impact damage, or delamination in metallic or composite structures. The instrument is especially useful in inspecting large areas where only external access is feasible, such as large aircraft, space vehicles, boats, or civil engineering structures with multiple connection lines. US20040165176A1 differs from the present invention in not disclosing a shearographic inspection system capable of performing submerged operations.

In view of the difficulties present in the State of the Art, for submerged inspection solutions in pipes coated with composite material, this does not have the unique features of this invention that will be presented in detail below.

Objective of the Invention

It is an objective of the invention to perform non-destructive inspections with shearography on composite material coatings applied to metallic pipelines located in fully submerged environments or in the TVZ (Tidal Variation Zone)—environments with the possibility of severe corrosion in metallic structures.

Another objective of the invention is to carry out inspections in other composite structures, also in fully submerged environments or in the TVZ.

It is further an objective of the invention to contribute so that composite material structures can have their life cycles extended, reducing maintenance and operation costs.

BRIEF DESCRIPTION OF THE INVENTION

In order to achieve the objectives described above, the present invention proposes the use of shearography for the non-destructive inspection of composite materials in an underwater environment. The good preliminary results achieved led to the proposal of a project whose general objective is the development of technologies (equipment and procedures) that enable the effective application of shearography in the non-destructive inspection of composite material repairs applied to submerged metallic pipelines.

The shearography system for subsea inspections, object of this invention, is characterized in that it comprises at least one laser vision and lighting module (VLM) (1), at least one fixation module (FM) (2), at least a thermal excitation module (TEM) (3), at least one command and power module (CPM) (4), and a computer (5).

BRIEF DESCRIPTION OF DRAWINGS

The present invention will be described in more detail below, with reference to the attached figures which, in a schematic form and not limiting the inventive scope, represent examples of its realization. In the drawings, there are:

FIGS. 5a-5b illustrate details of the system of the invention, top (5a) and side (5b) views;

FIG. 6 illustrating details of the Vision and Lighting module (VLM), with the arrangement of the interferometer and the diode lasers;

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible additional embodiments of the present invention further comprised by the essential and optional features below.

The present invention defines a system for performing non-destructive inspections using the shearography technique in composite material repairs applied to metallic pipelines located in fully submerged environments or in the TVZ (Tidal Variation Zone), or in other structures composites in the same environments. Shearography is a technique that can be performed during the operation of a well and without impacting its production.

The shearography system of this invention allows performing, in an automated way, measurements with shearography in an underwater environment. By means of a mechanized fixation device, the technique employed is capable of performing an optimized scan of the structure under investigation.

The proposed system may be fixed to the repaired pipe by means of divers or ROVs, and the inspection control is carried out entirely from the platform or support vessel on the surface.

Figure 1:
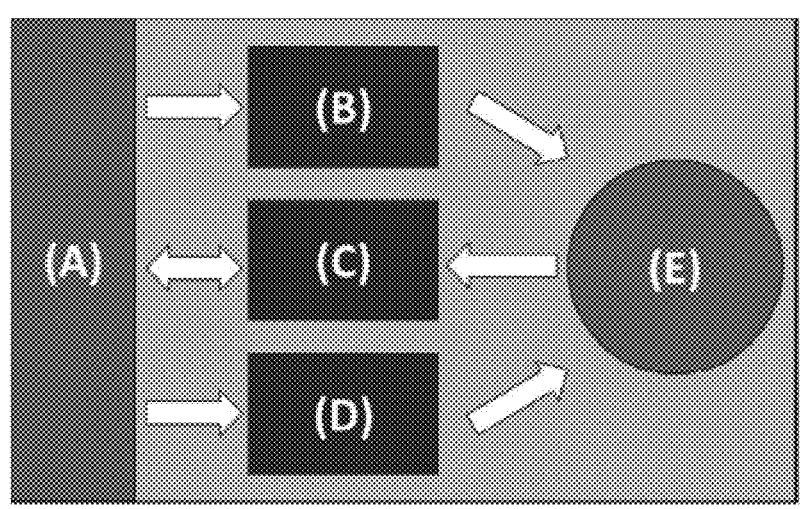
FIG. 1 illustrating the schematic representation of an inspection system with shearography.

The functional modules of a typical state-of-the-art system for inspection with shearography are shown schematically in FIG. 1. The lighting module (B) is responsible for lighting the part to be inspected (E) with laser light and with the proper angles. The image capture module (C) contains the interferometer, appropriate lenses and a camera. The loading module (D), in turn, applies a (thermal or mechanical) load to the inspected part (E) to produce a strain field on the surface of the inspected part. Through an interface with a computer (A), the software coordinates the actions of the lighting, acquisition and excitation modules and stores the results. Equally important is the inspection procedure, which, for each type of defect and type of structure to be inspected, determines the pattern, the intensity of the load to be applied, and the way to interpret the inspection results.

The shearography system for underwater inspections of the present invention basically consists of the following components: Laser Vision and Lighting Module (VLM) (1), Fixation Module (FM) (2), Thermal Excitation Module (TEM) (3), Command and Power Module (CPM) (4), and computer (laptop) (5). The representation of the components is illustrated in FIG. 2.

Figure 2:
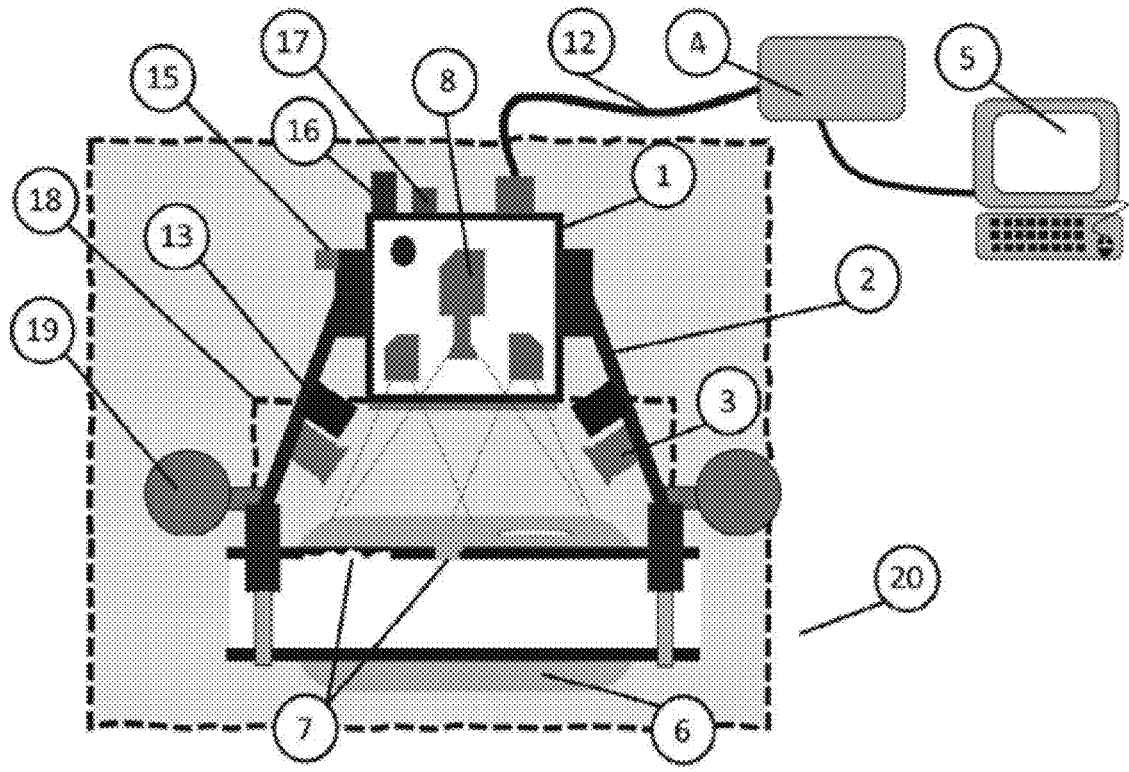
FIG. 2 illustrating the general configuration of the shearography system for non-destructive inspections in repair of composite material in a subsea environment, object of this invention.

In addition to showing the basic components of the shearography system for subsea inspections of the present invention, FIG. 2 also represents the inspection of a defective composite coating (6) applied to a metallic pipeline (7). This pipeline may also contain defects in its metallic wall (7), such as loss of thickness or through hole (also represented in FIG. 2; the left line indicates the loss of thickness in the pipe wall and the right line indicates the through hole).

The Vision and Lighting Module (VLM) (1) is a hermetic metallic casing and contains, inside, the vision device and 2 (two) laser lighting devices. The VLM (1) is also known as the inspection head. It has a connection to the CPM (4) through an electrical umbilical cable (12). The umbilical is responsible for the following connections: feeding of the Thermal Excitation Module (TEM) (3), which can generate heat by means of lamps or by means of an induction device, feeding of the digital camera, and feeding and receiving of signals from sensors and all electrical-electronic devices contained in the VLM (1).

The VLM (1) is mounted on the Fixation Module (FM) (2) by means of screws. The FM (2) is coupled to the pipeline to be inspected (7) by means of cargo straps with ratchet when operated by divers. When operating with ROVs, a motor-driven mechanical gripper system secures the inspection system to the coated pipe.

When the Thermal Excitation Module (TEM) (3) operates with a positive pressure variation, an additional hose will be used to pressurize the pipeline or pressure vessel to be inspected. In case the pressure of the line or the pressure vessel may be varied by the production plant team, and without prejudice to the operation, the external pressurization system will not be necessary.

The Command and Power Module (CPM) (4) is the bridge between the components that operate in a dry environment and the submerged components of the system. The CPM (4) is connected to the electrical grid and supplies all the power needed by the inspection system, including the laptop (5). The laptop (5) is connected to the CPM (4) through a GigE cable, whose purpose is to feed the digital video camera and transmit the shearography images captured during the inspection procedure.

After the initial setup of the inspection parameters, performed remotely via software from the surface, the inspection procedure using shearography for the non-destructive analysis of the composite repair can be divided into the following steps:

a) Positioning and fixing the shearography system in front of the inspection area;

b) Acquisition of the image of the reference state;

c) Application of the load for excitation of the investigated repair;

d) Acquisition of the image of the structure in the deformed state;

e) Processing of the acquired images with presentation of the final images with the Fringe Maps (also known as Phase Difference Maps).

Figure 3:
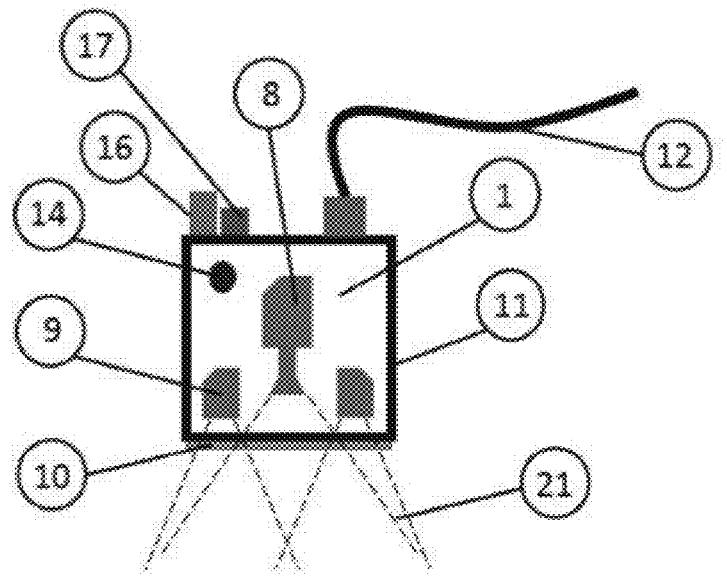
FIG. 3 illustrating internal components of the Vision and Lighting Module (VLM) of the present invention.

The VLM (1), represented in FIG. 2 and schematized in FIG. 3, then consists of the following components: shearography interferometer (8) consisting of a digital camera, interferometer, and motors for remote adjustment of the angle between the mirrors, which cause the lateral displacement of the images acquired in the X/Y, vertical and horizontal directions, expanded and temperature-controlled diode lasers (9), lighting angle of the diode laser, along with the camera's viewing angle (21), optical window for visualization of the inspection area (10), hermetic metallic casing (11), and connector for the umbilical cable (12). Additionally, the VLM (1) also has internal sensors (14) for detecting moisture or water ingress, temperature measurement and pressure or depth sensor, a communication button (15) to notify the surface that the system is being installed, or is ready to carry out the inspection (by means of colored indicators on the software screen in yellow and green, respectively), an emergency button (16) that turns off the equipment and lights up a red indicator on the software screen, indicating that the inspection has been canceled and that the divers are returning to the surface, a blue LED (17) on the outside of the VLM (1), which remains lit to indicate that the equipment can be adjusted or repositioned in another area to be inspected, and remains off during carrying out the measurement. The entire LED communication system can be replaced by an HMI (Human Machine Interface), which enables the sending of written messages, in addition to color signaling.

The VLM (1) is coupled to the FM (2) by means of screws. The FM (2) is responsible for ensuring the stability of the optical distances of the entire system on the inspected structure. It is manufactured with bent metal sheets (aluminum and stainless steel) and other mechanical components machined from stainless steel and polymeric materials. Hard anodizing on aluminum parts and sacrificial anodes are used as anticorrosion measures. The base of the FM (2) has 3 (three) nails (with adjustable heights) (23—FIG. 4b), which serve as support points and guarantee greater stability to the entire system, even on irregular surfaces. Nails are pointed supports that prevent the inspection system from slipping over the repair.

The FM (2) can be locked onto the inspected structure (7) by means of two lashing straps with ratchets or by driving 2 (two) motors (in the case of using ROVs) in a system of grippers with rack and pinion that adapts to the pipeline. Different sets of grippers must be used depending on the diameter of the pipeline to be inspected. The smallest set of grippers is capable of rigidly attaching to coated pipelines ranging in diameter from 6 to 14 inches (15.24 to 35.56 cm). For diameters between 14 and 22 inches (35.56 and 55.88 cm), the set of grippers must be changed, and so on as the pipeline diameter increases. In the case of coupling with straps and ratchets, there is no restriction on diameters, starting from 4 inches (10.16 cm). However, to date, there is no mechanism for handling the straps by means of ROVs, forcing the use of strap coupling for divers.

The FM (2) may contain sheets or side protections (18), in order to divert water currents from the measurement area, as the exaggerated flow of water can reduce the quality of the images acquired with the submarine shearography system. The system has floats (19) sized to leave all the equipment with neutral buoyancy and facilitate the work of divers or the ROV. A set of white light LEDs (13) is installed on the FM (2) to assist in capturing the original image of the inspected surface and mounting the inspection equipment to the pipeline.

For inspections of structures located in TVZs, due to sea level variations in these areas, a metallic casing (20) is installed that involves the entire inspection system and the inspected area. This casing will be filled with water in order to completely cover the shearography system during the inspection in the TVZ. In this type of inspection, the shearography system must remain completely submerged so that the water level between the VLM (1) and the inspected structure (7) remains constant—an essential condition for shearography inspections.

TEM (3) is also installed on FM (2). The thermal excitation of metallic structures repaired with composite can be carried out in two ways: by means of lamps, or by means of induction coils. In the first type, lamps are fixed outside the camera's vision zone and with their heating spots pointed towards the inspection area. In the second type, the induction coil is positioned over the inspection area (in front of the VLM (1)) and activated to thermally excite the metal under the composite. After the excitation is performed, the coil is removed from the front of the VLM (1), so that the shearography images are captured. The induction coil must be placed and removed through a pair of automated linear guides (22—FIG. 8), becoming an integral part of the FM (2).

The CPM (4) contains all the electronics needed to control the underwater shearography system. Contains the main umbilical connector (12), drivers and other electrical-electronic components such as USB connectors, electrical outlets, emergency button, and fans for cooling the internal components. The CPM (4) is mounted in a case made of high strength, waterproof propylene. It is the link between the laptop (5) (dry environment) and the underwater environment.

After installing the underwater shearography system on the structure (7), the laser lighting is activated. The surface of the inspected structure reflects laser light towards the inspection head (VLM (1)). The laser light (9) reflected by the surface of the composite (6) enters the VLM (1) through an objective lens and is projected onto the digital image sensor, after passing through the optical components of the shearography interferometer (8). The shearography maps are obtained by means of the inspection software, specially programmed to process the acquired images and reveal the presence of the detected defects. The inspection result can show the location of a specific defect, or the percentage of defective area in relation to the total area inspected.

The items represented in FIGS. 2 and 3 are, sequentially:
1—Laser Vision and Lighting Module (VLM) or inspection head;
2—Fixation Module (FM);
3—Thermal Excitation Module (TEM);
4—Command and Power Module (CPM);
5—Computer (Laptop);
6—Repair in composite material with internal defect;
7—Metallic pipeline with through hole;
8—Shearography interferometer;
9—Expanded diode laser with temperature control;
10—Optical Window;
11—Hermetic Metallic Casing;
12—Connector and Umbilical Cable;
13—Set of white light LEDs;
14—Sensors: Moisture, Temperature and Pressure distributed in the system;
15—Communication button;
16—Emergency button;
17—Inspection in Progress indicator LED;
18—Protection against water currents;
19—Floats;
20—TVZ casing;
21—Representation of viewing and lighting angles.

FIGS. 4a and 4b, 5a and 5b, and 6 present the three-dimensional models of the current mechanical design of the system of this invention for inspections with shearography in a submerged environment.

Figures 4A, 4B:
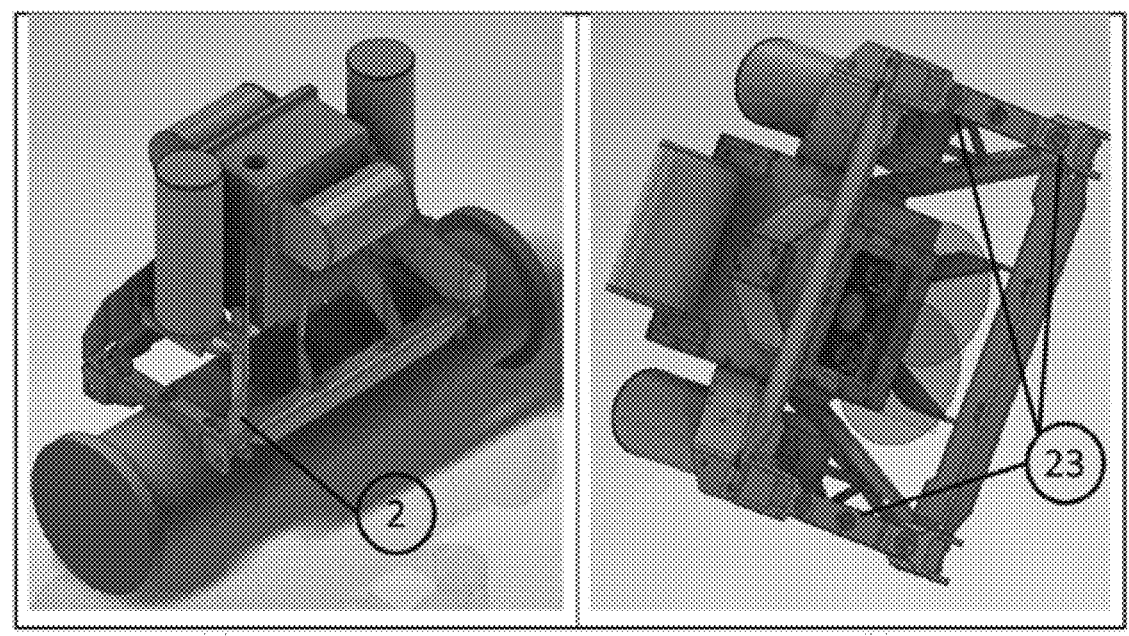
FIG. 4a illustrating the system of the invention positioned over a 6-inch (15.24 cm) tube.
FIG. 4b illustrating details of the lower part of the system, with the Fixation Module (FM) designed for use with straps or ratchets.

The system of this invention positioned over a 6-inch (15.24 cm) tube is represented in FIG. 4a. FIG. 4b illustrates details of the underside of the system with the Fixation Module (FM (2)) designed for use with straps or ratchets.

Details of the system of the invention are represented in FIGS. 5a and 5b, with front (5a) and top (5b) views.

Details of the vision and lighting module (VLM) of the system of this invention are represented in FIG. 6 showing, respectively, the arrangement of the interferometer and the diode lasers.

Figure 7:
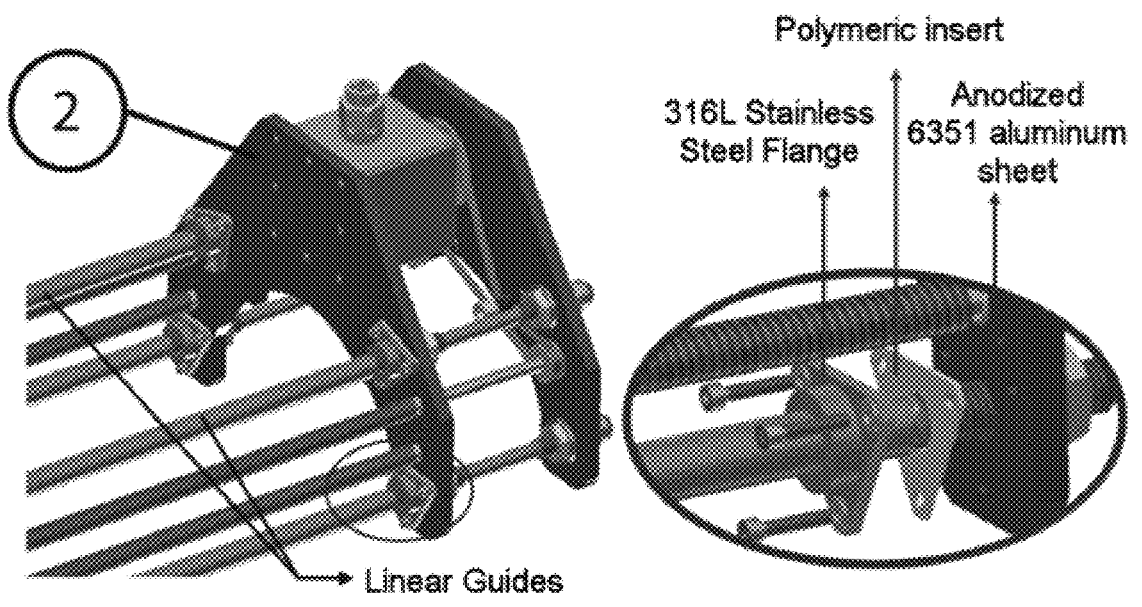
FIG. 7 illustrating the Fixation Module (FM) with automated movement of the inspection head through linear guides, in a structure designed for fixation by straps.

The Fixation Module (FM) (2) is represented in FIG. 7, with automated movement of the inspection head (1) through linear guides, in a structure designed for fixing by straps.

Figure 8:
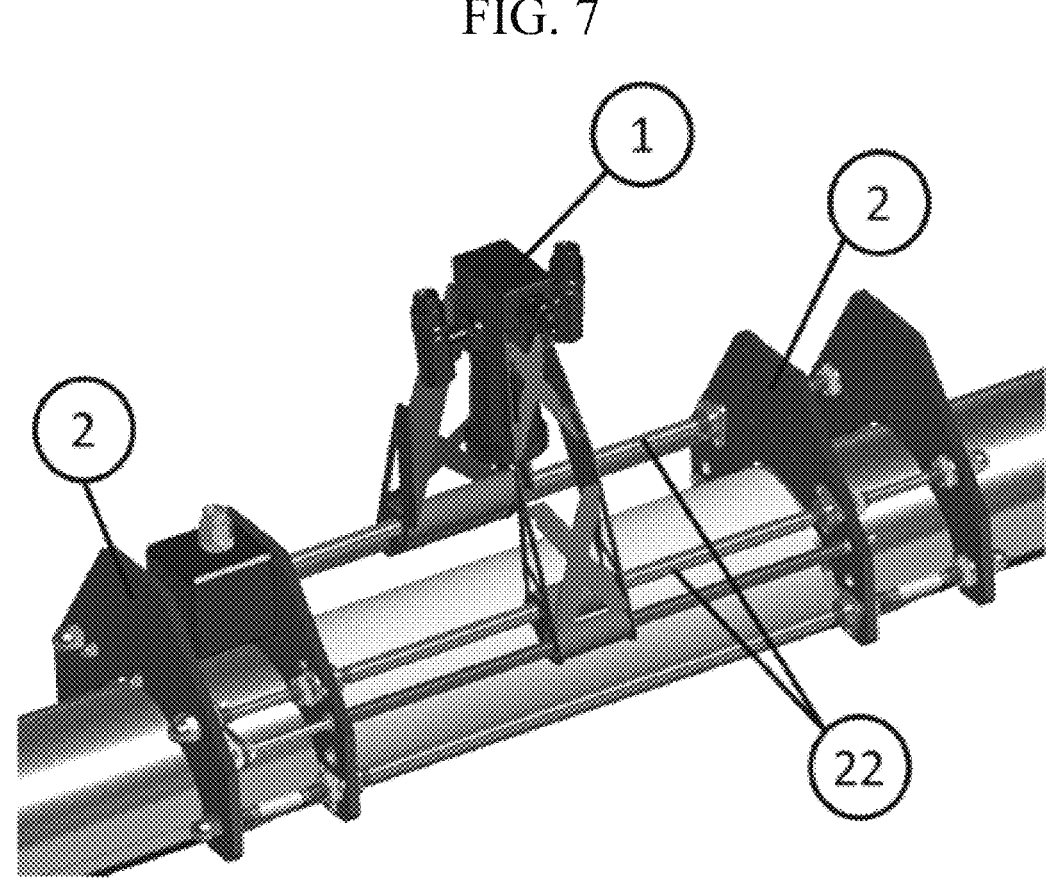
FIG. 8 illustrating the 3D modeling of the inspection system fitted to a 6-inch (15.24 cm) tube coated with composite material.

In FIG. 8 can be seen the 3D modeling of the inspection system fitted to a 6-inch (15.24 cm) tube coated with composite material.

Figures 9A, 9B:
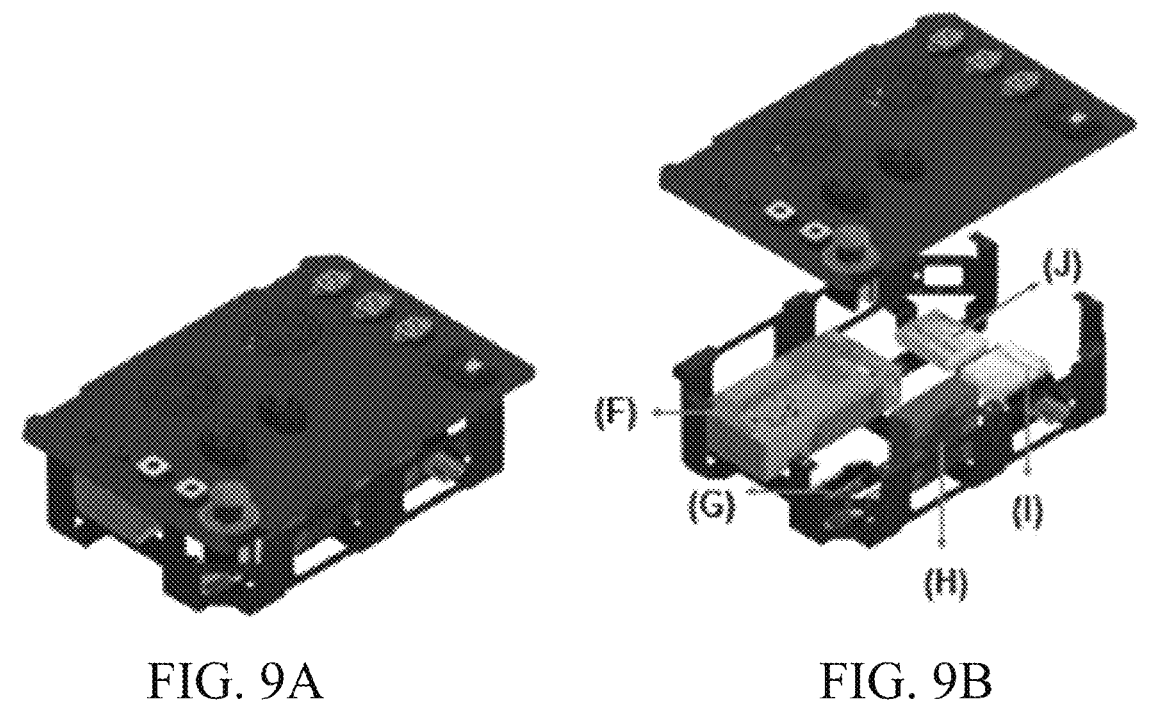
FIGS. 9a-9b illustrate the detail of the Control and Power Module (CPM)

The Control and Power Module (CPM) can be seen in detail in FIGS. 9a-9b, where a 24 V source (F), the laser driver (control circuit) (G), the stepper motor driver (H) and data acquisition boards (I) and (J) are illustrated. The stepper motor is responsible for moving the inspection system (VLM (1)) over the pipe.

Figure 10:
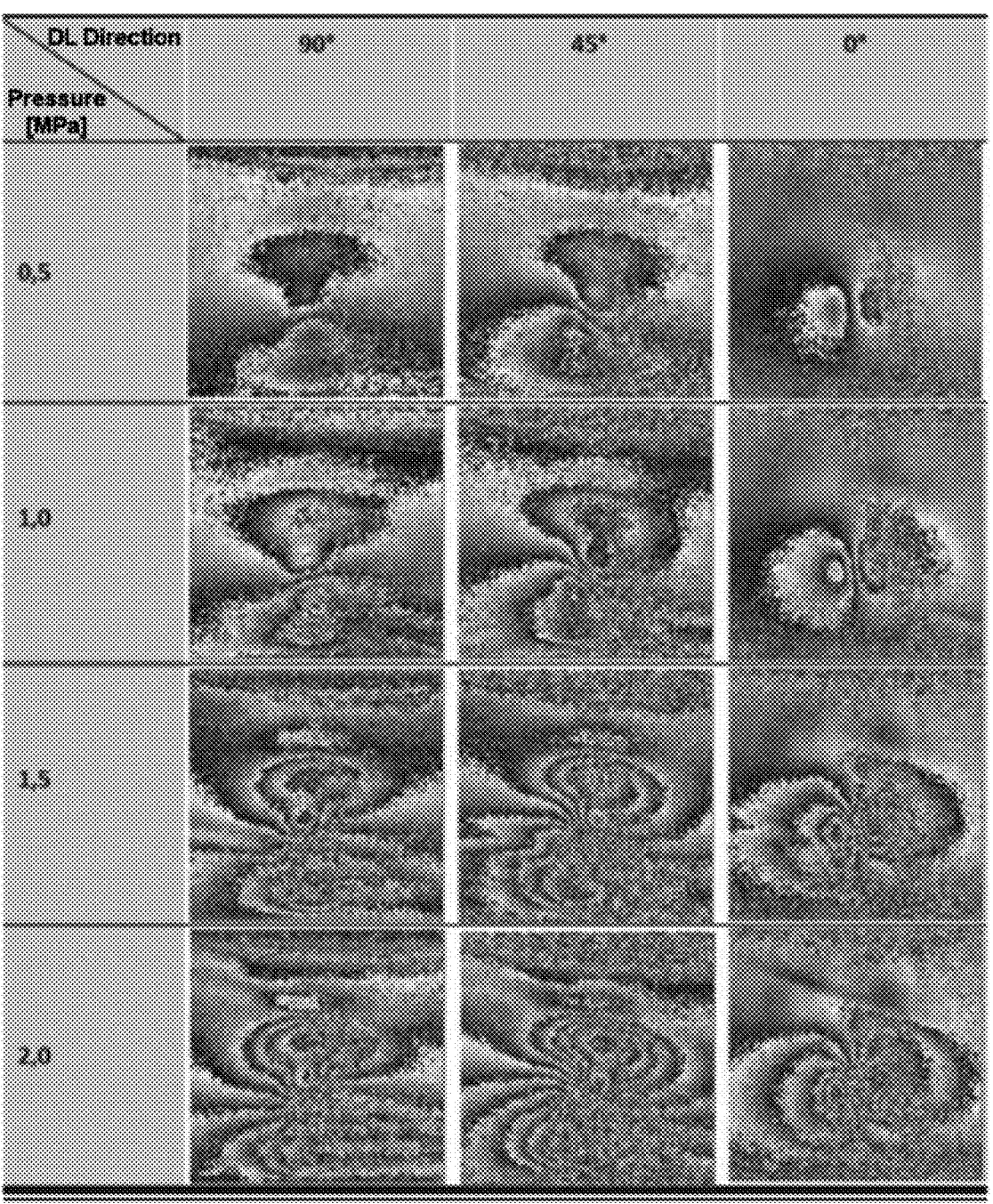
FIG. 10 illustrating shearography results obtained with the prototype of the invention in a submerged environment. Measurements are performed with different excitation levels and positive pressure variation.

Finally, FIG. 10 illustrates the shearography results obtained with the prototype of this invention in a submerged environment. Measurements were performed with different excitation levels and positive pressure variation.

We claim:

1. A shearography system for subsea inspections characterized in that the system comprises at least one Vision and Lighting Module (VLM), at least one Fixation Module (FM), at least one Thermal Excitation Module (TEM), at least one Command and Power Module (CPM), and a computer.

2. The shearography system for subsea inspections according to claim 1, characterized in that it is fixed to a repaired pipe by means of divers or ROVs.

3. The shearography system for subsea inspections according to claim 1, characterized in that inspection control is carried out entirely from a platform or support vessel on the surface.

4. The shearography system for subsea inspections according to claim 1, characterized in that the CPM bridges the gap between components that operate in a dry environment and submerged components of the system.

5. The shearography system for subsea inspections according to claim 4, characterized in that the CPM is connected to an electrical grid and supplies all energy necessary for the inspection system, including the computer.

6. The shearography system for subsea inspections according to claim 5, characterized in that the computer is connected to the CPM by means of a GigE cable, feeding a digital video camera and transmitting shearography images captured during an inspection procedure.

7. The shearography system for subsea inspections according to claim 1, characterized in that the (VLM) is a hermetic metallic casing that contains, inside, a vision device and lighting devices.

8. The shearography system for subsea inspections according to claim 7, characterized in that the lighting devices are of a laser type.

9. The shearography system for subsea inspections according to claim 1, characterized in that the (VLM) has a connection with the CPM by means of an umbilical electrical cable.

10. The shearography system for subsea inspections according to claim 9, characterized in that the umbilical electrical cable connects a feeding of the Thermal Excitation Module (TEM), a feeding of the digital camera, and a feeding and reception of the signals of the sensors and of all the electrical-electronic devices contained in the VLM.

11. The shearography system for subsea inspections according to claim 10, characterized in that the TEM generates heat by means of lamps or by means of an induction device.

12. The shearography system for subsea inspections according to claim 1, characterized in that the VLM is mounted on the FM by means of screws.

13. The shearography system for subsea inspections according to claim 12, characterized in that the base of the FM has adjustable height nails as support points for greater stability of the system.

14. The shearography system for subsea inspections according to claim 1, characterized in that the FM is coupled to a pipeline to be inspected by means of cargo straps with ratchet when operated by divers.

15. The shearography system for subsea inspections according to claim 14, characterized in that cargo straps with ratchet are used in a pipeline with a diameter of at least 4 inches (10.16 cm).

16. The shearography system for subsea inspections according to claim 1, characterized in that the FM is coupled to the pipeline to be inspected by means of a system of mechanical grippers with rack and pinion, activated by 2 (two) motors, which adapts to the pipeline when operated by ROV.

17. The shearography system for subsea inspections according to claim 16, characterized in that it has different sets of grippers, one type for pipeline diameters between 6 and 14 inches (15.24 to 35.56 cm), and another type for pipeline diameters between 14 and 22 inches (35.56 and 55.88 cm).

18. The shearography system for subsea inspections according to claim 1, characterized in that the FM has hard anodizing on aluminum parts and sacrificial anodes as anticorrosion measures.

19. The shearography system for subsea inspections according to claim 1, characterized in that the FM contains sheets or side protections to divert water currents from a measurement area.

20. The shearography system for subsea inspections according to claim 1, characterized in that the FM has floats sized to leave all the equipment with neutral buoyancy and a set of white light LEDs to assist in capturing an original image of an inspected surface and mounting the inspection equipment on the pipeline.

21. The shearography system for subsea inspections according to claim 1, characterized in that it uses an additional hose to pressurize the pipeline or pressure vessel to be inspected, when the TEM operates with positive pressure variation.

22. The shearography system for subsea inspections according to claim 1, characterized in that the VLM comprises the following components: shearography interferometer consisting of a digital camera, interferometer, and motors for remote adjustment of the angle between the mirrors, which cause lateral displacement of images acquired in X/Y, vertical and horizontal, directions, diode lasers, laser expansion lens, and temperature control, optical window for viewing the inspection area, hermetic metal casing, and umbilical cable connector, internal sensors for detecting moisture or water ingress, temperature gauge and pressure or depth sensor, communication button, emergency button, blue LED.

23. The shearography system for subsea inspections according to claim 22, characterized in that the entire LED communication system can be replaced by an HMI (Human Machine Interface) that enables sending written messages, in addition to color signaling.

24. The shearography system for subsea inspections according to claim 1, characterized in that it uses a metallic casing that involves the entire inspection system and the inspected area, when the inspection of the structure is located in a TVZ (Tidal Variation Zone).

25. The shearography system for subsea inspections according to claim 24, characterized in that the metallic casing is filled with water, in order to fully cover the shearography system during the time of inspection in the TVZ.

26. The shearography system for subsea inspections according to claim 1, characterized in that the CPM comprises the following components: main umbilical connector, drivers and other electrical-electronic components selected from USB connectors, electrical outlets, emergency button, and fans for cooling the internal components.

27. The shearography system for subsea inspections according to claim 26, characterized in that the CPM is mounted in a suitcase made of high-resistance and waterproof propylene.

* * * * *